US008836826B2

(12) United States Patent
Ohbuchi et al.

(10) Patent No.: US 8,836,826 B2
(45) Date of Patent: Sep. 16, 2014

(54) IMAGE SIGNAL PROCESSING APPARATUS AND IMAGE SIGNAL PROCESSING METHOD

(75) Inventors: Mari Ohbuchi, Yokohama (JP); Keisuke Kawamoto, Hitachinaka (JP); Hirotomo Sai, Yokohama (JP); Shinichi Nonaka, Zushi (JP)

(73) Assignee: Hitachi, Ltd., Tokyo (JP)

( * ) Notice: Subject to any disclaimer, the term of this patent is extended or adjusted under 35 U.S.C. 154(b) by 322 days.

(21) Appl. No.: 13/329,389

(22) Filed: Dec. 19, 2011

(65) Prior Publication Data
US 2012/0154645 A1   Jun. 21, 2012

(30) Foreign Application Priority Data
Dec. 21, 2010   (JP) .................................. 2010-283924

(51) Int. Cl.
*H04N 9/64* (2006.01)
*H04N 5/367* (2011.01)

(52) U.S. Cl.
CPC .................................... *H04N 5/367* (2013.01)
USPC ....................................................... 348/246

(58) Field of Classification Search
USPC ....................................................... 348/246
See application file for complete search history.

(56) References Cited

U.S. PATENT DOCUMENTS

| 5,796,430 | A * | 8/1998 | Katoh et al. | 348/246 |
| 2005/0078204 | A1 * | 4/2005 | Matsuoka et al. | 348/247 |
| 2010/0053383 | A1 | 3/2010 | Ichikawa | |
| 2010/0066872 | A1 * | 3/2010 | Yamaguchi | 348/246 |
| 2010/0315518 | A1 | 12/2010 | Sumiya | |
| 2011/0032393 | A1 * | 2/2011 | Yamaguchi | 348/247 |
| 2012/0300101 | A1 * | 11/2012 | Ichikawa | 348/246 |

FOREIGN PATENT DOCUMENTS

| CN | 101677359 | 3/2010 |
| JP | 2001-245200 | 9/2001 |
| JP | 2003-169258 | 6/2003 |
| JP | 2006-005912 | 1/2006 |
| JP | 2006-115201 | 4/2006 |
| JP | 2008-118609 | 5/2008 |

(Continued)

OTHER PUBLICATIONS

Office Action in corresponding Japanese Application No. 2010-283924, failed Jan. 28, 2014, with partial English translation thereof.

(Continued)

*Primary Examiner* — James Hannett
(74) *Attorney, Agent, or Firm* — Antonelli, Terry, Stout & Kraus, LLP.

(57) ABSTRACT

An image signal processing apparatus includes an imaging unit having an imaging element to conduct photoelectric conversion on incident light from a subject and output an electric signal, a defective pixel detection unit for detecting a defective pixel in the imaging element, a defective pixel correction unit for correcting the detected defective pixel, an image signal correction unit for conducting image signal correction every arbitrary area on a signal supplied from the defective pixel correction unit, a system control unit for generally controlling those units, and a temperature measurement unit for measuring temperature in the vicinity of the imaging element. The system control unit controls a detection condition to be used when the defective pixel detection unit detects a defective pixel, i.e., one or more of an exposure time, a defective pixel detection threshold, and a gain, by using information of the temperature obtained from the temperature measurement unit.

13 Claims, 7 Drawing Sheets

(56) References Cited

FOREIGN PATENT DOCUMENTS

| | | |
|---|---|---|
| JP | 2009-027289 | 2/2009 |
| JP | 2010-057114 | 3/2010 |
| JP | 2010-074240 | 4/2010 |
| JP | 2010-118780 | 5/2010 |
| JP | 2010-141738 | 6/2010 |
| JP | 2010-273378 | 12/2010 |

OTHER PUBLICATIONS

Office Action in corresponding Chinese Application No. 201110424621.9, mailed Dec. 3, 2013, with partial English translation thereof.

* cited by examiner

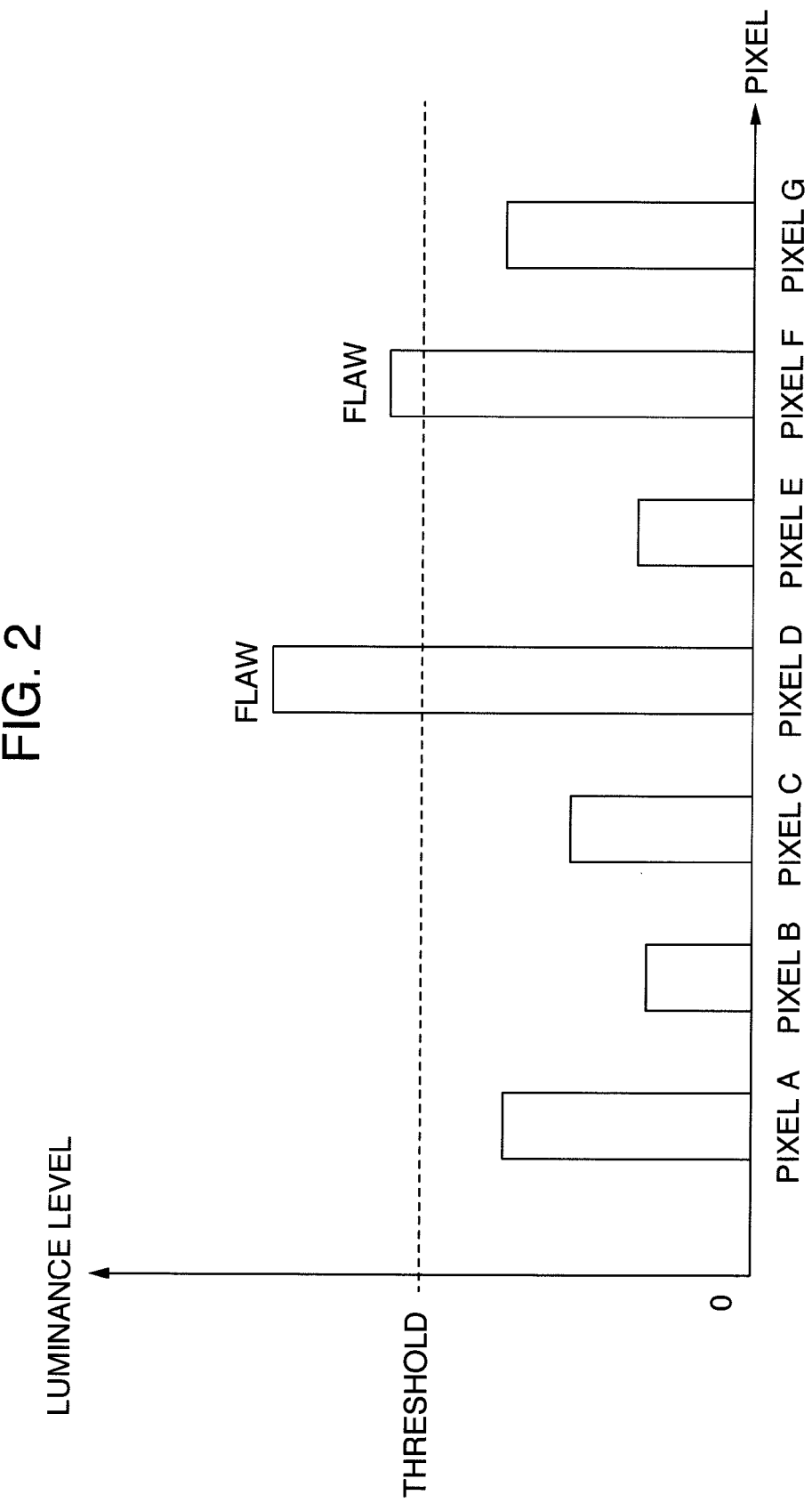

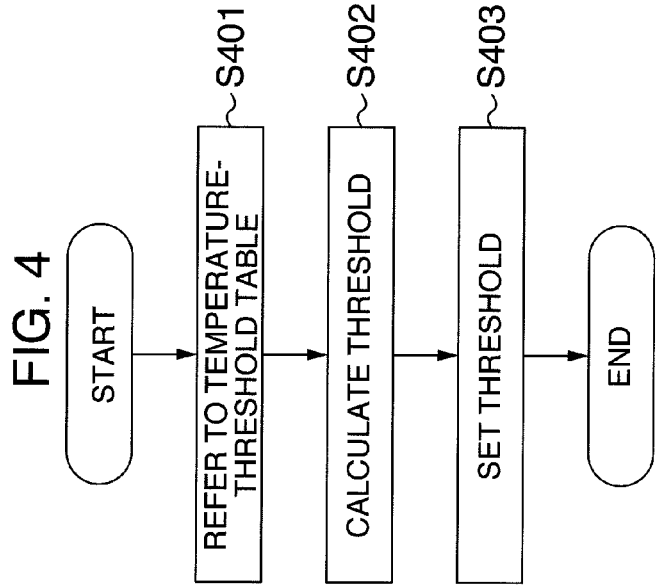
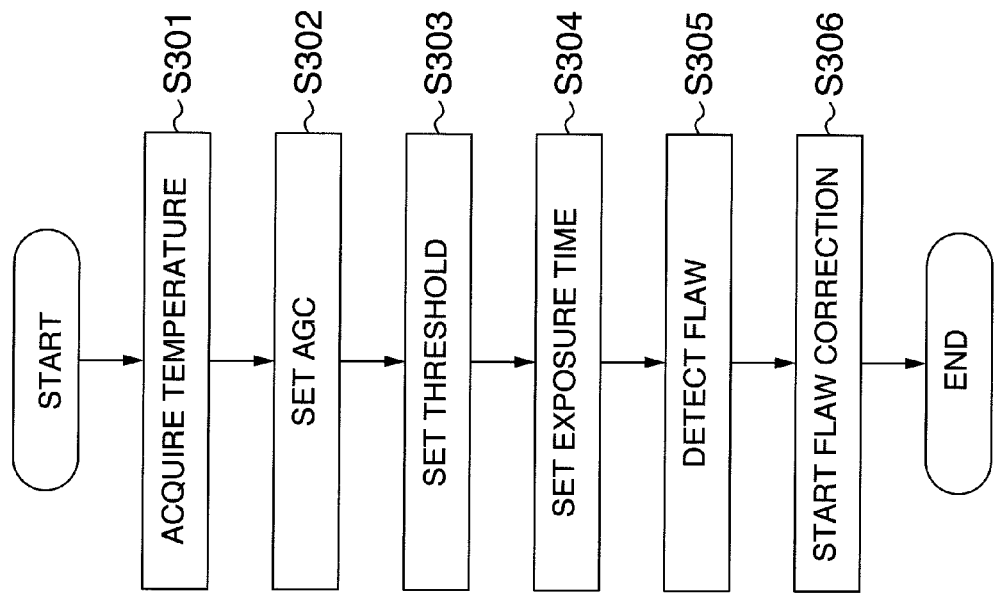

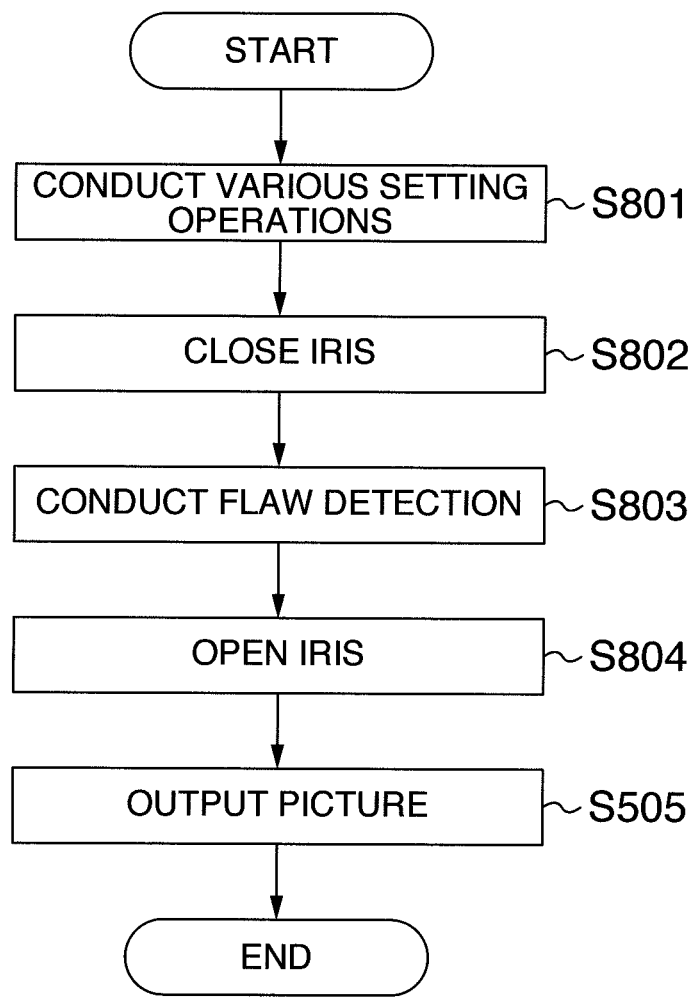

IMAGE SIGNAL PROCESSING APPARATUS AND IMAGE SIGNAL PROCESSING METHOD

INCORPORATION BY REFERENCE

The present application claims priority from Japanese application JP 2010-283924 filed on Dec. 21, 2010, the content of which is hereby incorporated by reference into this application.

BACKGROUND OF THE INVENTION

The present invention relates to an image signal processing apparatus and an image signal processing method.

As a background technique in the present technical field, for example, JPA-2010-273378 can be mentioned. According to ABSTRACT of JP-A-2010-273378, PROBLEM TO BE SOLVED is to provide an imaging device that can accurately detect a defect even if dark current noise occurs when performing noise reduction, and can prevent as much as possible reduction of an imaging dynamic range caused by increase of dark current noise; and a noise elimination method; and a noise elimination program using the imaging device. According to SOLUTION in ABSTRACT, an imaging device includes: an imaging means including a plurality of pixels for imaging a subject; a bright-state signal acquisition means for acquiring a bright-state signal obtained in a light non-shielding state; a dark-state signal acquisition means for acquiring a dark-state signal obtained in a light-shielding state; a first amplification means for amplifying the obtained bright-state signal or dark-state signal; a subtraction means for subtracting the acquired dark-state signal from the acquired bright-state signal and outputting a subtraction signal; a second amplification means for amplifying the subtraction signal as a result of the subtraction; an imaging condition acquiring means for acquiring an imaging condition when acquiring the bright-state signal; and a gain correcting means for changing gains of the first amplification means and the second amplification means based on the acquired imaging condition.

SUMMARY OF THE INVENTION

For example, in the typical imaging device such as a digital camera or a digital video camera, an imaging element for conducting photoelectric conversion on incident light is used. In the imaging element, there is the so-called white flaw such as a pixel which is different in output characteristics, or a pixel which outputs an abnormally high level signal. If a signal which is output by the imaging element is used as it is, therefore, a bad influence is exerted upon the picture quality. For attaining a higher picture quality in the digital camera or the digital video camera, means for correcting these flaws are needed.

Hereafter, typical flaw correcting techniques for correcting such flaws will be described. First, shooting is conducted in a state in which the shutter is closed, and a dark-state image is stored in a memory. Then, ordinary shooting is conducted in a state in which the shutter is opened, and a bright-state image is obtained. Noise reduction is implemented by subtracting the dark-state image from the obtained bright-state image. In this technique, however, correction of a saturated pixel of the bright-state image cannot be conducted accurately. In addition, two images: a dark-state image and a bright-state image must be shot every shooting, and power dissipation increases. JP-A-2010-273378 proposes an imaging device which accurately detects a defect even if dark current noise occurs when performing noise reduction, by changing gains for a bright-state signal, a dark-state signal, and a signal obtained by subtracting the dark-state signal from the bright-state signal according to the temperature. If the temperature rises, however, variations of the noise generation quantity and quality due to the gain control are great. As a result, it sometimes becomes insufficient in accurately correcting flaws which increase or decrease according to the temperature change.

Therefore, an object of the present invention is to provide an image signal processing apparatus and an image signal processing method which accurately corrects flaws which increase or decrease as the temperature changes. For example, an image signal processing apparatus and an image signal processing method which accurately corrects flaws by controlling a threshold for flaw detection according to the temperature are provided. As a result, it is possible to reduce noise. For example, it can be expected to hold down the bit rate at the time of encoding.

To solve the above problem one of configurations of the claims is adopted.

According to the present invention, flaws which increase or decrease in the imaging element as the temperature changes can be accurately corrected.

Problems, configurations and effects other than those described above will be elucidated by ensuing description of embodiments.

BRIEF DESCRIPTION OF THE DRAWINGS

FIG. 2 is a diagram for explaining an example of a method for detecting a flaw in a flaw correction unit 102;

FIG. 3 is a diagram showing an example of a flow of flaw correction control in the present embodiment;

FIG. 4 is a diagram showing an example of a flow of processing for controlling a flaw detection threshold by using temperature information obtained from a temperature measurement unit 105 and a temperature-threshold table which associates thresholds with temperature information at step S303 (FIG. 3);

FIG. 8 is a diagram showing an example of a flow of processing for conducting flaw detection during a time period between start of power supply to an image signal processing apparatus and outputting of a picture.

DETAILED DESCRIPTION OF THE INVENTION

Hereafter, embodiments of the present invention will be described with reference to the drawings.

Figure 1:
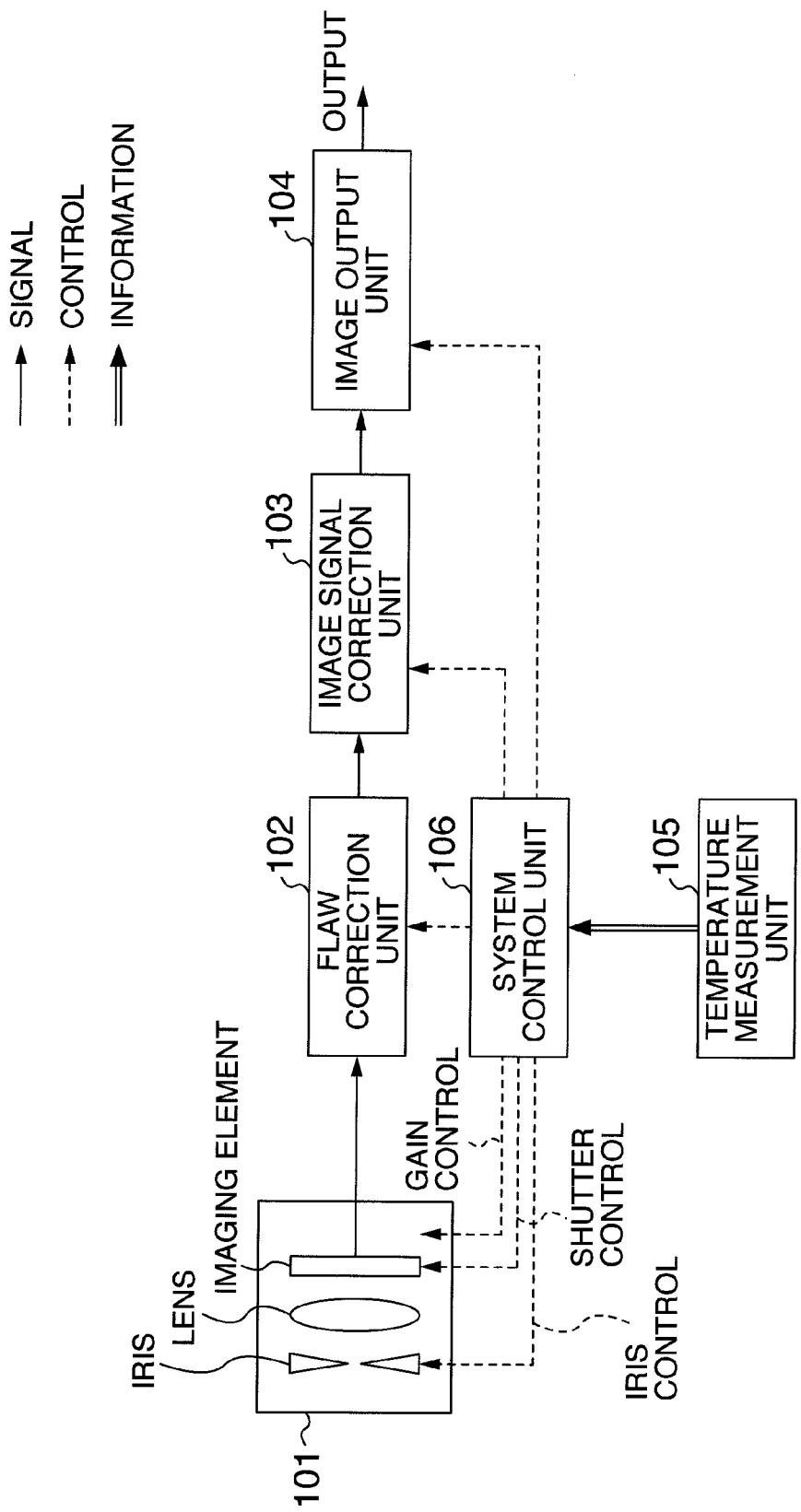
FIG. 1 is a diagram for explaining an example of a basic configuration in the present invention.

Embodiments of the present invention will be described in detail. FIG. 1 is a diagram for explaining an example of a basic configuration in the present invention. An imaging unit 101 is formed of an iris for adjusting the amount of incident light from a subject, a lens for condensing light passed through the iris, and an imaging element for conducting photoelectric conversion on light condensed by the lens and outputting a resultant signal as an image signal. A flaw correction unit 102 detects flaws contained in the image signal supplied from the imaging unit 101 and corrects them. An image signal correction unit 103 conducts image signal correction processing on an image signal supplied from the flaw correction unit 102. An image output unit 104 conducts predetermined processing on an image signal supplied from the image signal correction unit 103. By the way, the predetermined processing is image signal processing such as noise removal, gamma correction, contour emphasis, filter processing, zoom processing, hand shaking correction, and image recognition conducted on the image signal supplied from the image signal correction unit 103, and output interface processing for conducting conversion to a signal format of an output device such as a TV set or a storage. The output interface processing is, for example, conversion to a video output of the NTSC or PAL, conversion to an HDMI signal, or conversion to a predetermined signal for network transmission. In the present embodiment, the image signal correction unit and the image output unit which conducts the image signal processing are illustrated individually. However, the image signal correction unit may be included in a part of the image output unit. A temperature measurement unit 105 measures a temperature around the imaging element. A system control unit 106 controls the imaging unit 101, the flaw correction unit 102, the image signal correction unit 103, and the image output unit 104 by using information obtained from the temperature measurement unit 107 as occasion demands.

Owing to the configuration described heretofore, flaws which increase or decrease according to a temperature change can be corrected accurately.

FIG. 2 is a diagram for explaining an example of a method used by the flaw correction unit 102 to detect a flaw. The abscissa axis represents pixels, and the ordinate axis represents a luminance level of each pixel. In the present embodiment, the flaw correction unit 102 compares the luminance level of each pixel with a flaw detection threshold. If the luminance level is higher than the threshold, then the flaw correction unit 102 judges the pixel to be a defective pixel and detects the pixel as a flaw. According to the present technique, the so-called white flaw can be detected. According to the present technique, detection is possible even if flaws occur consecutively to adjoin each other. Although not illustrated, it is also possible as another means to compare an evaluation value calculated from a luminance level of a noted pixel or peripheral pixels or an evaluation value calculated from luminance levels of both the noted pixel and the peripheral pixels with a threshold, and judge the noted pixel to be a defective pixel when the evaluation value is greater than the threshold, and detect the noted pixel as a flaw. As a result, it is possible to make a decision whether the noted pixels is a flaw by using the relation to adjoining pixels. Even in an image in which the black level is not stabilized and much noise is contained, therefore, desired flaws including white flaws can be detected.

FIG. 3 is a diagram showing an example of a flow of flaw correction control in the present embodiment. At step S301, the temperature measurement unit 105 measures and acquires temperature in the vicinity of the imaging element. At step S302, the system control unit 106 sets an AGC. At step S303, the system control unit 106 sets a threshold for flaw detection. At step S304, the system control unit sets an exposure time. At step S305, the flaw correction unit 102 detects a flaw. At step S306, the flaw correction unit 102 starts the flaw correction.

By the way, the processing between the step S302 and the step S304 may be changed in order.

FIG. 4 is a diagram showing an example of a flow of processing for controlling the flaw detection threshold by using temperature information obtained from the temperature measurement unit 105 and a temperature-threshold table which associates thresholds with temperature information at step S303 (FIG. 3). For facilitating the flaw detection, the exposure time is set to be long and flaw detection is conducted in a state in which the AGC is applied to some degree. This is because prolonging the exposure time facilitates detection of a pixel which will grow to a prominent flaw when the temperature rises in the future, even in a state in which the temperature in the vicinity of the imaging element is low. If the AGC is changed in a state in which the temperature in the vicinity of the imaging element is high, the change of the picture quality becomes remarkable. Therefore, the AGC is held down to some degree. If the flaw detection processing is started, the system control unit 106 refers to the temperature-threshold table which associates the thresholds with temperature information at step S401. As for this table, it is also possible to retain the values in an EEPROM (electrically Erasable Programmable Read-Only Memory) or the like and use it. At step S402, the system control unit 106 calculates a threshold on the basis of the table and the temperature information. The system control unit 106 sets the calculated threshold at step S403, and finishes the processing. It is possible to prevent the number of detected flaws from becoming large extremely by controlling the threshold according to the temperature. By the way, the threshold may not be calculated on the basis of the temperature-threshold table, but may be calculated on the basis of a function expression and the temperature information. In the case where the function expression is used, it is possible to grasp a relation between the temperature and the proper threshold in detail and retained data can be reduced as compared with the method of retaining data as the table.

Since the threshold for flaw detection can be controlled according to the temperature in the vicinity of the imaging element, flaws which increase or decrease according to the temperature can be corrected accurately as described heretofore.

Figure 5:
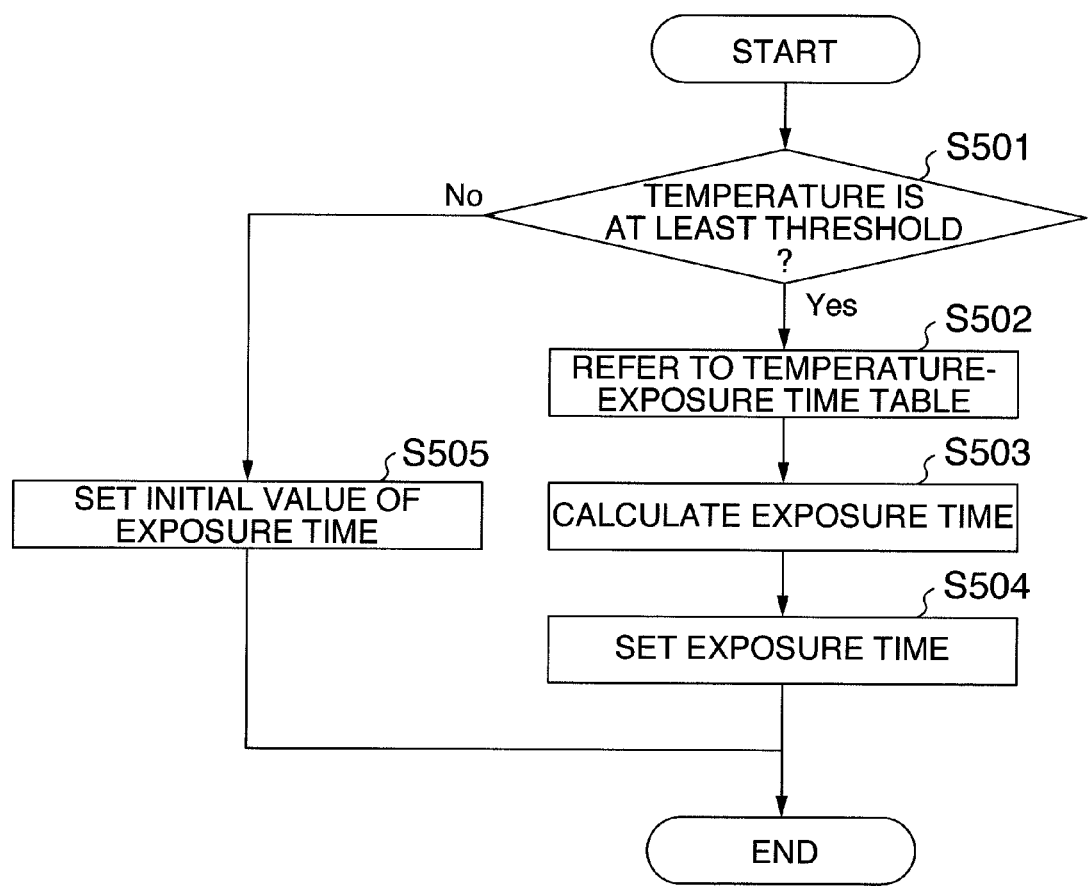
FIG. 5 is a diagram showing an example of a flow of processing for controlling exposure time at the time of flaw detection according to temperature information obtained from the temperature measurement unit 105 at step S304 (FIG. 3)

FIG. 5 is a diagram showing an example of a flow of processing for controlling the exposure time at the time of flaw detection according to temperature information obtained from the temperature measurement unit 105 at the step S304 (FIG. 3). As described above, the exposure time is set to be long in order to facilitate flaw detection. When the temperature rises extremely, however, the number of flaws and sizes of the flaws increase extremely sometimes. In that case, flaw correction causes image degradation sometimes. In order to cope with this problem, in the present embodiment, the exposure time is controlled according to the temperature in the vicinity of the imaging element to prevent the number of detected flaws from becoming extremely large. At step S501, the system control unit 106 makes a decision whether the temperature information obtained from the temperature measurement unit 105 is at least the threshold. If the temperature information is at least the threshold, then the system control unit 106 refers to the temperature- exposure time table which associates the thresholds with temperature information at step S502. As for the table and the thresholds, it is also possible to retain values in an EEPROM or the like and use it. At step S503, the system control unit 106 calculates exposure time on the basis of the table and the temperature information. The system control unit 106 sets the calculated exposure time at step S504, and finishes processing. If the temperature of the temperature information is lower than the threshold at the step S501, then the system control unit 106 sets an initial value of the exposure time at step S505. As a result, the number of flaws and sizes of the flaws can be prevented from increasing extremely when the temperature rises extremely. By the way, the exposure time may not be calculated on the basis of the temperature-exposure time table, but may be calculated on the basis of a function expression and the temperature information. In the case where the function expression is used, it is possible to grasp a relation between the temperature and the proper exposure time in detail and retained data can be reduced as compared with the method of retaining data as the table.

Even in the case where the temperature rises extremely, flaw correction can be conducted accurately without image degradation.

Figure 6:
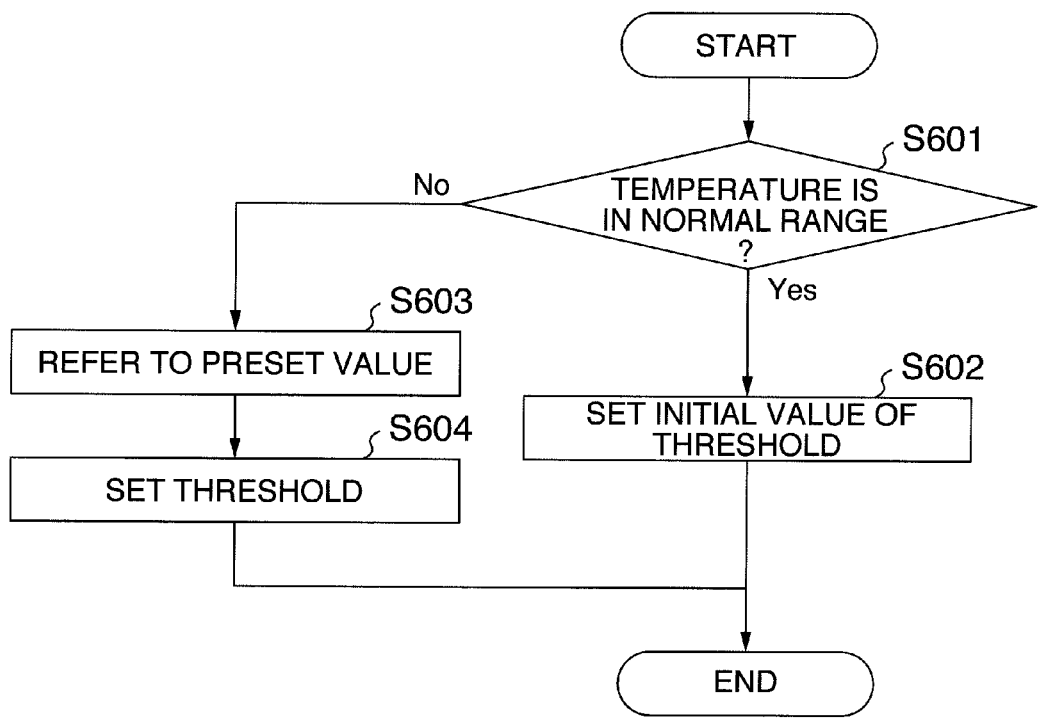
FIG. 6 is a diagram showing an example of a flow of processing conducted when temperature information obtained from the temperature measurement unit 105 is improper.

FIG. 6 is a diagram showing an example of a flow of processing conducted when temperature information obtained from the temperature measurement unit 105 is improper. For example, when using a temperature measurement unit of a kind which is attached to a lens in a video camera and which measures a synthetic resistance of a resister of the temperature measurement unit and a resistor on the substrate and acquires temperature information after A/D conversion by using an AD converter in a microcomputer, dispersion occurs in the measured temperature sometimes. Furthermore, an improper value is output due to a failure or a faulty operation sometimes. If in such a case automatic control is conducted on a preset value according to the temperature, then, for example, the number of detected flaws increases abnormally and consequently the flaws cannot be corrected accurately. For avoiding such a problem, in the present embodiment it is inspected whether temperature information obtained from the temperature measurement unit is within an allowable range and a flaw detection condition is controlled according to a result thereof. Processing for controlling the flaw detection threshold according to the result of the inspection will now be described with reference to FIG. 6. At step S601, the system control unit 106 makes a decision whether the temperature information obtained from the temperature measurement unit 105 is in a normal range. It is also possible to retain an upper limit value and a lower limit value of the temperature indicating the normal range in an EEPROM and use them. If the temperature is within the normal range, the system control unit 106 sets an initial value of the flaw detection threshold at step S602 and finishes processing. If the temperature is not within the normal range, the system control unit 106 refers to a preset value of the threshold for a temperature outside the normal range at step S603 and sets the obtained value as a flaw detection threshold at step S604. It is also possible to retain preset a value of the threshold for each temperature outside the normal range in an EEPROM and use it.

Even in the case where the temperature measuring unit outputs an improper value due to a failure or a faulty operation, it is possible to prevent the picture quality from being degraded by flaw correction, owing to the processing described heretofore.

Figure 7:
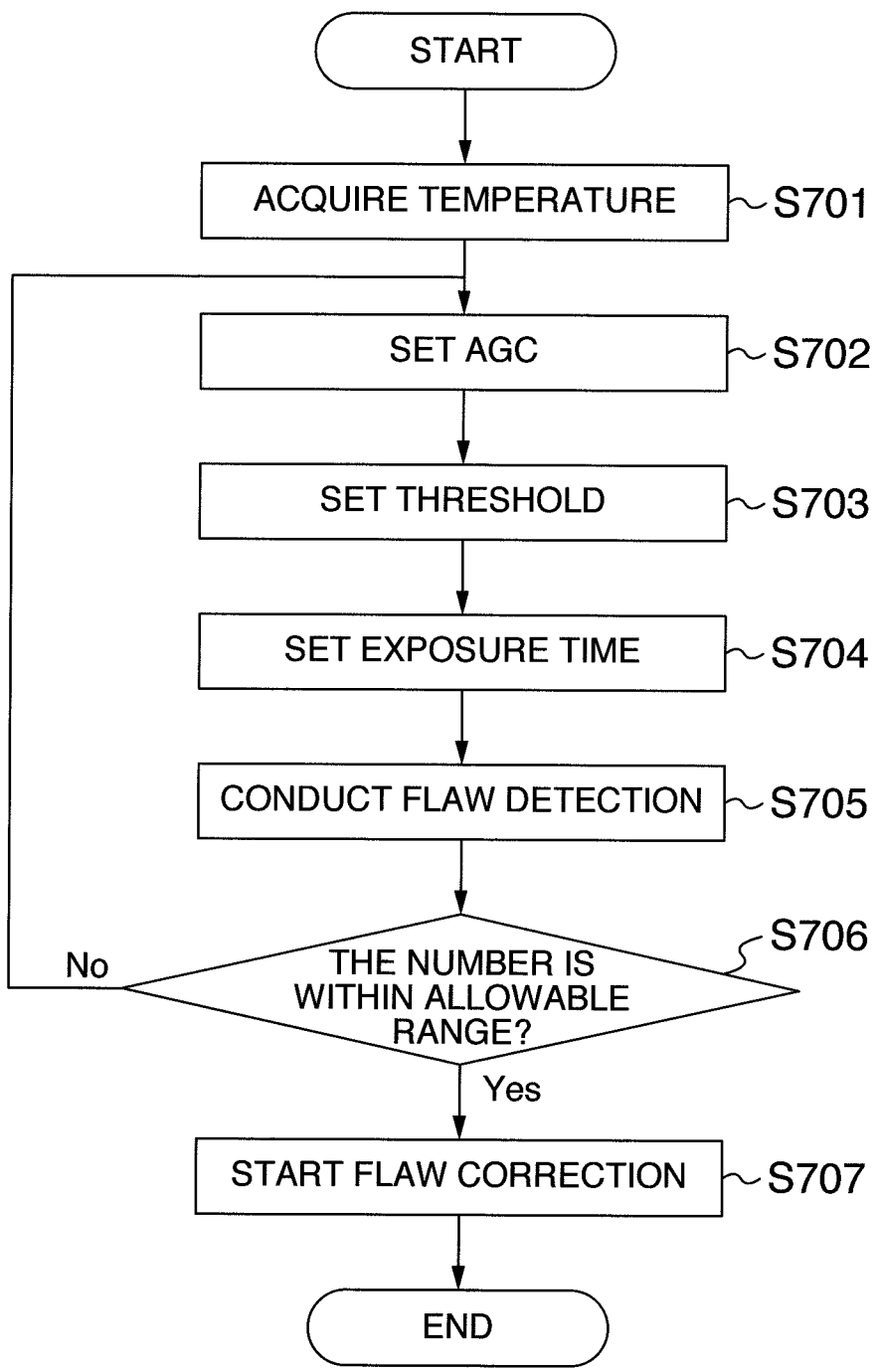
FIG. 7 is a diagram showing an example of a flow of processing for making a decision whether to conduct flaw re-detection according to the number of detected flaws.

FIG. 7 is a diagram showing an example of a flow of processing for making a decision whether to conduct flaw re-detection according to the number of detected flaws. If an extremely large number of flaws are detected and corrected, an evil such as occurrence of a flaw (noise) in a pixel in which a flaw does not exist originally is caused sometimes. The present embodiment copes with this problem by limiting the number of detected flaws. The number of detected flaws is calculated by the flaw correction unit 102. At step S701, the temperature measurement unit 105 measures and acquires the temperature in the vicinity of the imaging element. At step S702, the system control unit 106 sets the AGC. At step S703, the system control unit 106 sets a flaw detection threshold. At step S704, the system control unit 106 sets an exposure time. At step S705, the flaw correction unit 102 conducts the flaw detection. At step S706, the system control unit 106 refers to the number of detected flaws calculated by the flaw correction unit 102 and makes a decision whether the number of detected flaws is within an allowable range. If the number of detected flaws is within the allowable range, then the flaw correction unit 102 starts flaw correction at step S707, and finishes the processing. If the number of detected flaws is not within the allowable range at the step S706, then the processing returns to the step S702, and setting of one or more among the AGC, the threshold, and the exposure time is changed and flaw detection is conducted again. It is also possible to retain change quantities of the AGC, the threshold, and the exposure time in an EEPROM and use them. The change quantities may be linked with the number of detected flaws, or may be constants. By the way, the processing between the step S702 and the step S704 may be different in order.

Owing to the processing described heretofore, it is possible to prevent the evil such as occurrence of a flaw (noise) in a pixel in which no flaws exist originally, caused by an extremely large number of detected and corrected flaws.

FIG. 8 is a diagram showing an example of a flow of processing for conducting flaw detection during a time period between start of power supply to the image signal processing apparatus and outputting of a picture. For detecting a flaw, it is necessary to shield light by, for example, closing the iris. For example, in a video camera, there is little chance of shielding light once the video camera is brought into a recordable state. Therefore, it becomes important to detect as many flaws as possible when the camera is started. In the present embodiment, as many flaws as possible are detected at the time of camera start by closing the iris at the time of camera start and detecting flaws with a prolonged exposure time. At step S801, the system control unit 106 sets the AGC, the flaw detection threshold, and the exposure time. At step S802, the system control unit 106 instructs the imaging unit 101 to close the iris. At step S803, the flaw correction unit 102 conducts the flaw detection. At step S804, the system control unit 106 instructs the imaging unit 101 to open the iris. At step S805, a picture is output.

Owing to the processing described hereafter, as many flaws as possible can be detected at the time of camera start. The present invention can provide a video of high picture quality corrected in flaws from immediately after the start of the camera. Furthermore, it is possible to avoid a situation in which light is shielded after the start for the purpose of flaw detection and video recording becomes impossible.

By the way, the present invention is not restricted to the above-described embodiment, but various modifications are included. For example, the embodiment has been described in detail to explain the present invention intelligibly, and the present invention is not necessarily restricted to an embodiment having all configurations described. Furthermore, it is possible to replace a part of a configuration of a certain embodiment by a configuration of another embodiment, and it is also possible to add a configuration of another embodiment to a configuration of a certain embodiment. Furthermore, it is possible to conduct addition, deletion or replacement of another configuration with respect to a part of a configuration of each embodiment.

As for each of the above-described configurations, a part or the whole thereof may be formed of hardware or may be implemented by executing a program in a processor. As for control lines and information lines, lines which are considered to be necessary for explanation are shown and all control lines and information lines in the product are not necessarily shown. As a matter of fact, it may be considered that almost all configurations are connected to each other.

The invention claimed is:

1. An image signal processing apparatus, comprising:
    an imaging unit, having an imaging element configured to conduct photoelectric conversion on incident light from a subject and to output a resultant signal as an electric signal;
    a defective pixel detection unit configured to detect a defective pixel in the imaging element;
    a defective pixel quantity calculation unit configured to calculate the quantity of defective pixels detected when the defective pixel detection unit detects a plurality of defective pixels;
    a defective pixel correction unit configured to correct a defective pixel detected by the defective pixel detection unit;
    an image signal correction unit configured to conduct image signal correction on a signal supplied from the defective pixel correction unit;
    a temperature measurement unit configured to measure a temperature value in a vicinity of the imaging element; and
    a system control unit configured to control the imaging unit, the defective pixel detection unit, the defective pixel correction unit, and the image signal correction unit;
    wherein when the temperature value obtained from the temperature measurement unit is less than a temperature threshold, the system control unit is configured to increase a defective pixel detection threshold and/or decrease a gain control, in order to decrease the quantity of the pixels to be corrected to be within a allowable quantity; and
    wherein when the temperature value obtained from the temperature measurement unit is greater than or equal to the temperature threshold, the system control unit is configured to control the defective pixel detection unit to: detect a defective pixel by using a predetermined defective pixel detection threshold used when the temperature value is greater than or equal to the temperature threshold, and correct the detected defective pixel.

2. The image signal processing apparatus according to claim 1,
    wherein a function expression is retained, which is configured to calculate a detection condition to be used when the defective pixel detection unit detects a defective pixel;
    wherein the system control unit is configured to calculate the detection condition to be used when detecting a defective pixel, by using the function expression and the temperature value obtained from the temperature measurement unit; and
    wherein the defective pixel detection unit is configured to conduct defective pixel detection by using the detection condition.

3. The image signal processing apparatus according to claim 1,
    wherein information, which associates a detection condition to be used when the defective pixel detection unit detects a defective pixel with a temperature value obtained from the temperature measurement unit, is retained as a table;
    wherein the system control unit is configured to calculate the detection condition to be used when detecting a defective pixel, by using information in the table and the temperature value obtained from the temperature measurement unit; and
    wherein the defective pixel detection unit is configured to conduct defective pixel detection by using the detection condition.

4. The image signal processing apparatus according to claim 1,
    wherein the system control unit is configured to control the defective pixel detection unit to conduct an additional defective pixel detection, in accordance with the quantity of defective pixels obtained from the defective pixel quantity calculation unit, in order to decrease the quantity of the pixels to be corrected to be within a allowable quantity.

5. The image signal processing apparatus according to claim 2,
    wherein the system control unit is configured to control the defective pixel detection unit to conduct an additional defective pixel detection, in accordance with the quantity of defective pixels obtained from the defective pixel quantity calculation unit, in order to decrease the quantity of the pixels to be corrected to be within a allowable quantity.

6. The image signal processing apparatus according to claim 3,
    wherein the system control unit is configured to control the defective pixel detection unit to conduct an additional defective pixel detection, in accordance with the quantity of defective pixels obtained from the defective pixel quantity calculation unit, in order to decrease the quantity of the pixels to be corrected to be within a allowable quantity.

7. The image signal processing apparatus according to claim 1, wherein the defective pixel detection unit is configured to conduct the defective pixel detection during a time period between start of power supply to the image signal processing apparatus and outputting of a picture.

8. The image signal processing apparatus according to claim 2, wherein the defective pixel detection unit is configured to conduct the defective pixel detection during a time period between start of power supply to the image signal processing apparatus and outputting of a picture.

9. The image signal processing apparatus according to claim 3, wherein the defective pixel detection unit is configured to conduct the defective pixel detection during a time period between start of power supply to the image signal processing apparatus and outputting of a picture.

10. The image signal processing apparatus according to claim 4, wherein the defective pixel detection unit is configured to conduct the defective pixel detection during a time period between start of power supply to the image signal processing apparatus and outputting of a picture.

11. The image signal processing apparatus according to claim 5, wherein the defective pixel detection unit is configured to conduct the defective pixel detection during a time period between start of power supply to the image signal processing apparatus and outputting of a picture.

12. The image signal processing apparatus according to claim 6, wherein the defective pixel detection unit is configured to conduct the defective pixel detection during a time period between start of power supply to the image signal processing apparatus and outputting of a picture.

13. An image signal processing method for an image signal processing apparatus having an imaging element, the image signal processing method comprising:
- an imaging step of conducting photoelectric conversion on incident light from a subject and outputting a resultant signal as an electric signal;
- a defective pixel detection step of detecting a defective pixel in the imaging element;
- a defective pixel quantity calculation unit configured to calculate the quantity of defective pixels detected when the defective pixel detection unit detects defective pixels;
- a defective pixel correction step of correcting a defective pixel detected at the defective pixel detection step;
- an image signal correction step of conducting image signal correction on a signal obtained at the defective pixel correction step; and
- a temperature measurement step of measuring temperature in vicinity of the imaging element;
- wherein when the temperature value obtained from the temperature measurement unit is less than a temperature threshold, the system control unit increases a defective pixel detection threshold and/or decreases a gain control, in order to decrease the quantity of the pixels to be corrected to be within a allowable quantity; and
- wherein when the temperature value obtained from the temperature measurement unit is greater than or equal to the temperature threshold, the system control unit controls the defective pixel detection unit to: detect a defective pixel by using a predetermined defective pixel detection threshold used when the temperature value is greater than or equal to the temperature threshold, and correct the detected defective pixel.

* * * * *